(12) United States Patent
Suhr et al.

(10) Patent No.: US 6,364,123 B1
(45) Date of Patent: Apr. 2, 2002

(54) DEVICE FOR RECUPERATING FLOATING MATERIALS IN A SEDIMENTATION TANK

(75) Inventors: Patrick Suhr; Jean-Pierre Virecoulon, both of Rueil Malmaison (FR)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 09/646,394

(22) PCT Filed: Feb. 9, 1999

(86) PCT No.: PCT/FR99/00281

§ 371 Date: Sep. 18, 2000

§ 102(e) Date: Sep. 18, 2000

(87) PCT Pub. No.: WO99/47231

PCT Pub. Date: Sep. 23, 1999

(30) Foreign Application Priority Data

Mar. 16, 1998 (FR) .............................................. 98 03198

(51) Int. Cl.[7] .............................................. B01D 21/24
(52) U.S. Cl. ........................ 210/523; 210/525; 210/540
(58) Field of Search ........................... 210/242.1, 242.3, 210/523, 525, 538, 540

(56) References Cited

U.S. PATENT DOCUMENTS

| | | | | |
|---|---|---|---|---|
| 2,249,049 A | * | 7/1941 | Sayers et al. ............... | 210/525 |
| 3,307,701 A | * | 3/1967 | Krofta | |
| 3,447,683 A | * | 6/1969 | Luce, Jr. ..................... | 210/540 |
| 4,426,288 A | * | 1/1984 | Munte ..................... | 210/242.3 |
| 4,931,175 A | * | 6/1990 | Krofta ......................... | 210/525 |
| 5,188,729 A | * | 2/1993 | Krofta ......................... | 210/540 |
| 5,194,164 A | * | 3/1993 | Adams ..................... | 210/242.3 |
| 5,380,431 A | * | 1/1995 | Newsom ................. | 210/242.3 |
| 5,948,277 A | * | 9/1999 | Frankenberger ............. | 210/540 |
| 6,238,559 B1 | * | 5/2001 | Heyek ......................... | 210/525 |

FOREIGN PATENT DOCUMENTS

| | | | |
|---|---|---|---|
| DE | 3405468 | * | 8/1985 |
| DE | 9115155 | * | 5/1992 |
| FR | 2189325 | * | 1/1974 |
| FR | 2345400 | * | 10/1977 |
| FR | 2429185 | * | 1/1980 |

* cited by examiner

Primary Examiner—Christopher Upton
(74) Attorney, Agent, or Firm—Connolly Bove Lodge & Hutz LLP

(57) ABSTRACT

The invention concerns a device for recuperating floating materials in sedimentation tanks in installations treating effluent water. The invention is characterized in that it is in the form of a rotary syphon implanted above the tank at the end thereof and comprising an immersed discharge pipe, including a longitudinal slot and closed at one end and open at the other, an immersed bucket welded on said discharge pipe, over the whole length thereof, and a gear motor periodically driving in rotation over 360° the discharge pipe bucket assembly such that the floating materials are recuperated at each rotation by said bucket whereof the position relative to the immersed pipe is determined so that the floating materials are discharged into said pipe through its longitudinal slot then evacuated by gravity through said immersed pipe open end.

9 Claims, 2 Drawing Sheets

DEVICE FOR RECUPERATING FLOATING MATERIALS IN A SEDIMENTATION TANK

FIELD OF THE INVENTION

The present invention relates to a device for collecting layers of fat known as "floating matter" which forms in residual water treatment settling tanks after the flocculation zone. This device is more particularly applicable to settling tanks of rectangular shape.

BRIEF DESCRIPTION OF THE INVENTION

In such settling tanks, the floating matter is formed either naturally or as the result of degreasing, and the mass of floating matter is greater when it is the result of an in-situ degreasing of the effluent. It is therefore essential for this floating matter to be removed periodically to allow the settling process to continue correctly and also for reasons associated with the aesthetics of the work.

BACKGROUND OF THE INVENTION

At the present time, use is made of floating matter collection systems which are produced in the form of a partially submerged chute, open at the top, positioned at the end of the tank, and the manual or motorized periodic pivoting of which creates a sheet of water that carries along the floating matter which is then removed from the settling tank by a removal duct.

Under actual conditions of use, these known devices have the following particular drawbacks:
- a problem of dynamic sealing between the settling tank and the duct that removes the floating matter, in the region of the chute;
- the presence of a significant amount of water accompanying the floating matter, causing this to be diluted, this dilution impeding any downstream treatment of the fats,
- haphazard collection of thick floating matter which can only with difficulty be carried along by a shallow sheet of water, and
- the difficulty of removing the floating matter in the chute under gravity.

Starting out from this state of the art, the present invention sets out to provide a novel device that allows the drawbacks outlined above to be avoided.

In consequence, the subject of the present invention is a device for collecting floating matter that forms on settling tanks in residual water treatment plants, characterized in that it is in the form of a rotary skimmer fitted above the tank at the end thereof and which comprises:
- an emerged flow tube which has a longitudinal slot and which is closed at one end and open at the other;
- a submerged, preferably segmented bucket welded to the said flow tube along the entire length of the latter, and
- a motor driving the tube plus bucket assembly periodically through 360° so that the floating matter is collected on each rotation by the said bucket, whose position with respect to the emerged flow tube is determined so that the said floating matter is poured out into the said tube via its longitudinal slot then removed under gravity through the open end of the said emerged tube.

According to a preferred embodiment of the invention, the drive motor is mounted at one of the ends of the flow tube via a coupling comprising a flange and a system of elastic blocks, and at the other end of the said tube there is a support system consisting of rollers, arranged preferably 120° apart.

According to the present invention, there is an inductive sensor that detects the stopping position of the said rotary skimmer, using a metal block provided on the flange coupling the motor to the flow tube.

As a preference, according to the present invention, the device is operated as one complete rotation, followed by a time delay, but this operation may take the form of a number of consecutive rotations, followed by a time delay or of continuous rotation, depending on the desired removal rates. It is possible to provide an automated mechanism for controlling the motor, this being based on an adjustable time delay, setting the period of standby between two floating-matter-collection cycles.

According to another embodiment of the device of the invention, there is a deflector on that wall of the tank along which the said rotary skimmer is mounted, at the height of the level of water in the said tank, so as to avoid any stagnation zone in the zone from which floating matter is taken. This deflector may, for example, be made in the form of an inverted angle bracket.

Other features and advantages of the present invention will become apparent from the description given hereinafter with reference to the appended drawing which illustrates one entirely non-limiting embodiment thereof.

DETAILED DESCRIPTION

Figure 1:
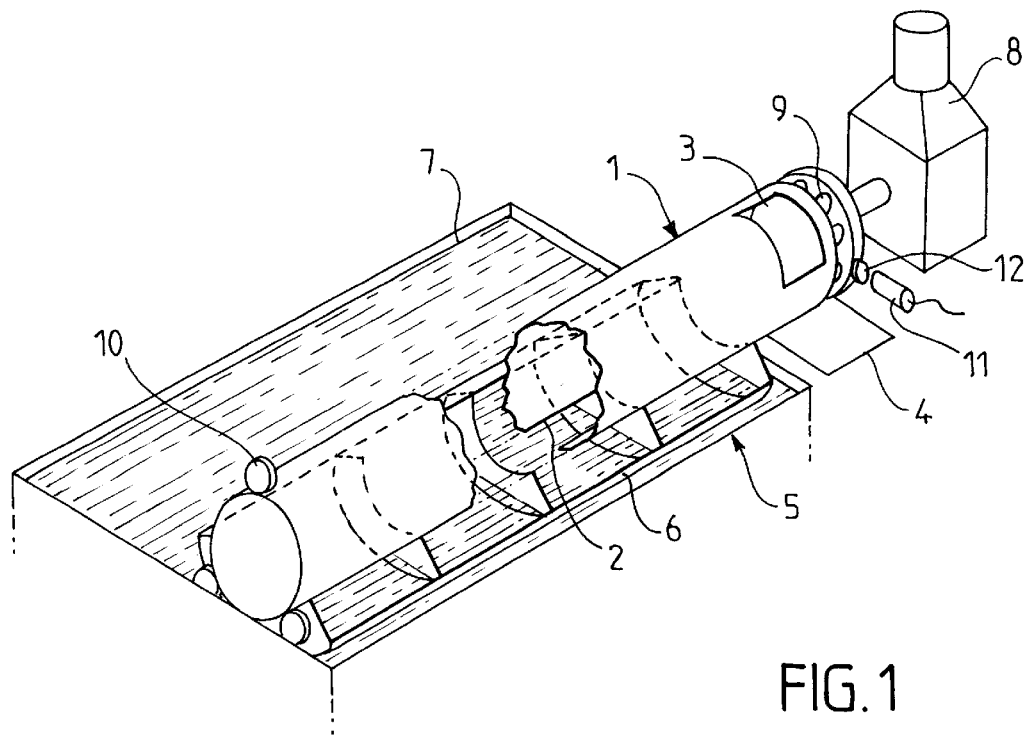
FIG. 1 is a perspective depiction of the device that is the subject of the invention.

Referring to FIG. 1 of the appended drawing, it can be seen that the device which is the subject of the present invention is in the form of a rotary skimmer of all-welded construction, fitted above the settling tank 5 at one end thereof. In the embodiment illustrated in FIG. 1, this device comprises the following elements:
- an emerged flow tube 1, which has a longitudinal slot 2 in the form of a slit, along the entire length of the tube 1, the latter being closed at one end and open at the other end via an aperture 3, the latter being positioned above a discharge orifice 4. This tube, as can be clearly seen in FIG. 1, covers the entire width of the settling tank 5;
- a bucket 6, preferably segmented, which is submerged (during the stage of collecting the floating matter, as will be seen hereinafter), below the level 7 of the liquid contained in the settling tank 5, this bucket 6 being welded to the flow tube 1 along the entire length thereof;
- at the open end of the tube 1, a geared motor unit 8 for providing rotational drive, clamped to the tube 1 for example via elastic blocks such as 9, the tube 1 being supported, at the closed end, by, for example, rollers 10 arranged 120° apart.

This device may also comprise an inductive sensor 11 that detects the stopping position of the skimmer using a metal block 12 provided on the flange coupling the geared motor unit 8 to the tube 1.

According to the invention, it is also possible to provide an automated mechanism for controlling the geared motor unit 8, which mechanism relies on a simple adjustable time delay, setting the period of standby between two floating-matter-collection cycles.

The way in which the device thus described works is particularly simple. This operation is illustrated diagrammatically by FIG. 2 of the appended drawing which represent the successive positions of the device during a floating-matter-collection operation.

As will be understood, in each rotation, the rotary skimmer according to the invention collects floating matter which has accumulated against the wall of the tank 5, together with a limited volume of water. This collection (stage 13 in FIG. 2) is performed by virtue of the presence of the bucket 6. It will be noted that the device that forms the subject of the present invention allows floating matter to be collected however thick it may be, unlike the chute system which does not collect thick floating matter, or collects such matter badly.

During the next stage, 14, the floating matter accompanied by the limited volume of water is tipped out into the flow tube 1 through the longitudinal slot 2 therein (the position of the bucket 6 with respect to the said slot 2 is determined so that this tipping out is possible, that is to say the bucket is arranged above the slot 2) and this is all removed under gravity into the discharge orifice 4 through the aperture 3 of the flow tube 1 (stage 15). It will be noted that by virtue of operation of the invention, the floating matter is placed in suspension by the lasting drop in the volume of water, which phenomenon makes removal under gravity in the flow tube 1 easier and rinses the inside of the tube.

Figure 2:
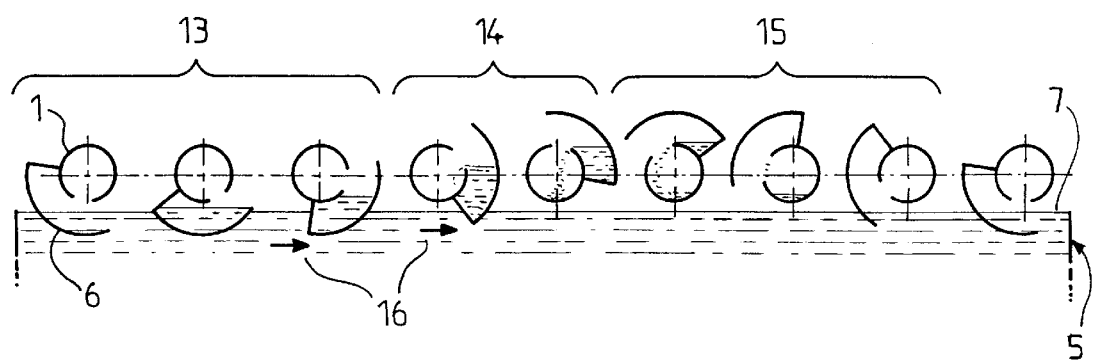
FIG. 2 is an end-on view of this device in operation, illustrating the various stages in the removal of floating matter.

The withdrawing of the volume of liquid from the tank 5 creates a current denoted by the arrows 16 in FIG. 2, which drives the next floating matter against the wall of the tank where the rotary skimmer is located.

The device that is the subject of the present invention can be operated either as one complete rotation followed by a time delay, or as a number of consecutive rotations of the skimmer, followed by a time delay, or in continuous rotation, depending on the desired removal rates.

According to the invention, the device is positioned against the flow, the aperture of the submerged bucket facing that wall of the tank along which the rotary skimmer that is the subject of the invention is positioned.

Figure 3:
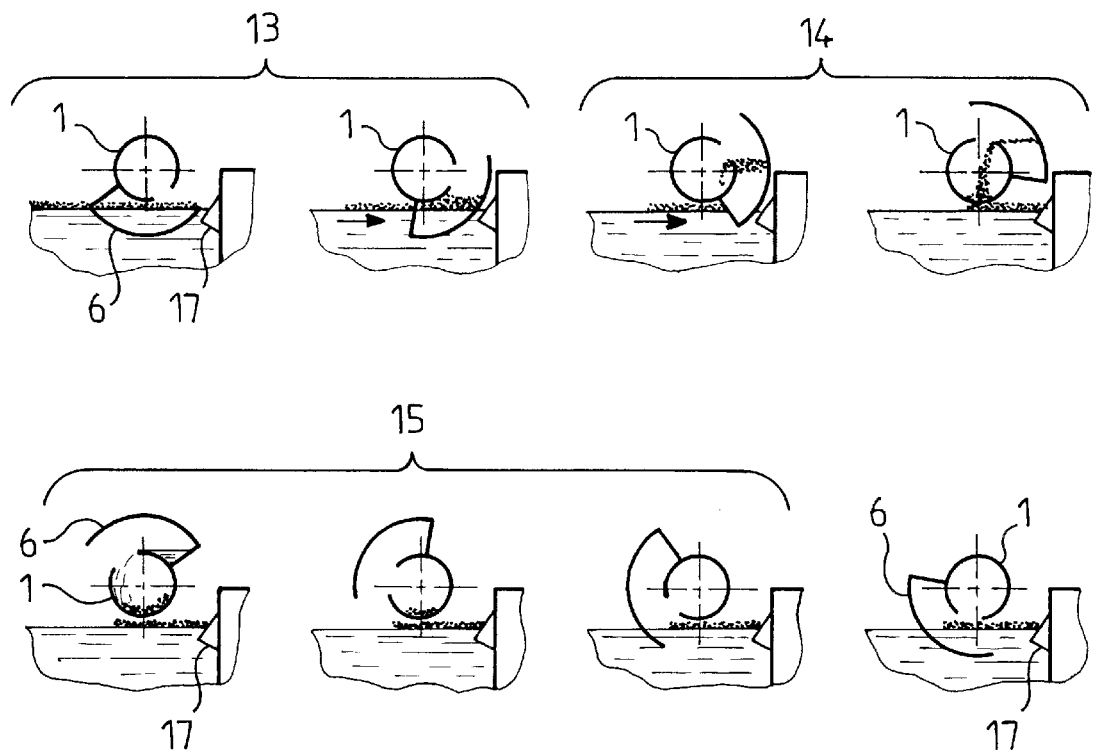
FIG. 3 is a view similar to FIG. 2 depicting an alternative form of the device according to the invention.

In the alternative form of FIG. 3, which is a view similar to that of FIG. 2, and in which identical components have been denoted by the same references, there is a deflector 17 on that wall of the tank 5 along which the said rotary skimmer is mounted, at the height of the level of water in the said tank, so as to avoid any stagnation zone in the zone from which the floating matter is taken. In this non-limiting example, this deflector 17 has been made in the form of an inverted angle bracket. The various stages 13, 14, 15 of the operation described hereinabove with reference to FIG. 2 has been read across onto this FIG. 3. A dark line has been used to denote the floating matter so as to distinguish it from the volume of water scooped up, and in this figure it can be seen that the floating matter is first to flow into the tube 1, and that the scooped-up water then rinses the tube.

It must remain clearly understood that the present invention is not restricted to the embodiments described and/or depicted but that it encompasses all alternative forms thereof which fall within the context and scope of the appended claims.

What is claimed is:

1. In a settling tank of rectangular shape for residual water treatment plants, a device for collecting floating matter, comprising:

a rotary skimmer placed at one end of the settling tank and having an emerged flow tube with a longitudinal slot and closed at one end and open at the other end via a slit; a bucket welded to said tube along the entire length of the tube; and drive means for driving the rotation of said skimmer; and a deflector on that wall of the tank along which said skimmer is mounted, this deflector being provided at the height of the level of water in said tank.

2. Device according to claim 1, wherein said deflector is made in the form of an inverted angle bracket.

3. Device according to claim 1, wherein said bucket is segmented.

4. Device according to claim 1, wherein said geared motor unit affording rotational drive is mounted, at one end of said flow tube, via a coupling comprising a flange and elastic blocks and, at the other end of said tube, there is a support system including a plurality of rollers.

5. Device according to claim 4, further comprising an inductive sensor that detects the stopping position of the rotary skimmer, using a metal block provided on the flange coupling the motor to the tube.

6. Device according to claim 1, further comprising an automated mechanism for controlling the geared motor unit, which mechanism is based on an adjustable time delay setting the period of standby between two floating-matter-collection cycles.

7. Device according to claim 1, wherein a bucket opening faces a wall of the tank, along which said skimmer is mounted, during a bucket immersion phase.

8. Device according to claim 1, wherein the drive means comprises geared motor means for driving the flow tube plus bucket assembly periodically through 360° so that the floating matter is collected on each rotation by said bucket, whose position with respect to the emerged flow tube is determined so that said floating matter is poured out into said tube via its longitudinal slot then removed under gravity through the open end of said emerged tube.

9. Device according to claim 1, wherein the drive means comprises geared motor means for selectively driving said rotary skimmer for one complete rotation followed by a time delay, or for a number of consecutive rotations followed by a time delay, or in continuous rotation, depending on the desired removal rates.

\* \* \* \* \*